United States Patent [19]
Vicard

[11] 4,040,608
[45] Aug. 9, 1977

[54] METHOD FOR THE RECOVERY OF GASES COMING FROM REFINING FURNACES

[76] Inventor: Jean-François Vicard, Lyon, France

[21] Appl. No.: 625,724

[22] Filed: Oct. 24, 1975

[30] Foreign Application Priority Data

| Oct. 29, 1974 | France | 74.40613 |
| Nov. 29, 1974 | France | 74.40698 |
| Jan. 30, 1975 | France | 75.03510 |

[51] Int. Cl.² .............................................. C21B 7/22
[52] U.S. Cl. ..................................... 266/44; 266/88; 266/156; 266/158
[58] Field of Search ............... 75/60; 122/7 A; 431/2, 431/6, 8, 190; 266/44, 88, 78, 156, 158, 159

[56] References Cited

U.S. PATENT DOCUMENTS

| 3,194,651 | 7/1965 | Namy et al. | 266/158 X |
| 3,227,141 | 1/1966 | Fahie | 122/7 A |
| 3,342,472 | 9/1967 | Namy et al. | 266/158 X |
| 3,617,043 | 11/1971 | Hirao | 266/158 X |
| 3,863,906 | 2/1975 | Vicard | 266/158 |
| 3,908,969 | 9/1975 | Baum et al. | 266/158 X |

FOREIGN PATENT DOCUMENTS

| 2,262,915 | 12/1973 | Germany | 266/158 |
| 387,751 | 2/1933 | United Kingdom | 431/190 |

Primary Examiner—Roy Lake
Assistant Examiner—Paul A. Bell
Attorney, Agent, or Firm—Dowell & Dowell

[57] ABSTRACT

A method and apparatus for the recovery of gases issuing from a metallurgical refining furnace or converter, in which said gases are drawn off through a hood disposed above the outlet of the furnace and are entered as a gas column into a combustion chamber from which the burnt gases are drawn off by a main blower while air is simultaneously drawn from a space around the furnace adjacent to the inlet of said hood by means of an auxiliary blower and is forced into said combustion chamber to burn combustible components of said gases therewithin, the invention further including withdrawing a fraction of said combustible gases by sucking them from said gas column within the combustion chamber substantially before they are mixed with burnt combustion products generated within said combustion chamber to send said withdrawn fraction to utilization means which are external to said combustion chamber, and the invention further including the control of the rates of flow of the gases through various conduits in the system to optimize the desired operation.

12 Claims, 4 Drawing Figures

METHOD FOR THE RECOVERY OF GASES COMING FROM REFINING FURNACES

The present invention relates to the recovery of gases emitted by metallurgical converter installations and the like, in the manner described in U.S. Pat. No. 3,863,906.

In that Patent, the gas is drawn off by means of a system of pipes opening at a slight distance above the outlet of the converter, whereas ambient air is drawn in at the same time in an annular space surrounding the inlet of this gas suction pipe and this air is sent by means of separate blower into a combustion chamber through which the gases pass, in order to burn the latter, dust being removed from the combustion gases and the latter discharged through a flue. A fraction of the burnt gases, from which dust has been removed, is preferably re-cycled into an intermediate annular space provided between the gas suction pipe and the air suction pipe with a view to constituting an inert separating screen between the air and combustible gases coming from the converter.

In practice, the emission of gases from a metallurgical converter is very irregular as regards quality and quantity. During certain stages, the gas emitted is constituted mainly by inert $CO_2$. During other stages, the gas emerging is almost exclusively combustible CO. It should be added that during certain blast methods, nitrogen or $CO_2$ which is found at last partly in the emerging gases, is mixed with oxygen. All this therefore requires incessant regulation of the blowers. Furthermore, if it is desired that the combustion chamber does not stop producing heat (for example if it oprates as boiler and the production of steam is to be continuous), particular appropriate means should be provided (auxiliary fuel oil burner, sending combustible gas coming from several converters which are not operating in synchronism to the same chamber etc.). The installation is thus complicated and its use is made more difficult.

According to the invention, a fraction of the gases supplied to the combustion chamber is removed, thus preventing all of the latter from burning therein, with a view to sending said fraction to an appropriate utilisation point.

According to another feature of the invention, the output of the auxiliary blower is reduced, in order to eliminate or at least decrease the combustion of the gases in the chamber, to a considerable extent.

It is advantageous to regulate the output of the main blower depending on parameters corresponding substantially to the temperature of the air drawn in by the auxiliary blower. It is possible to use a thermometric detector in particular, arranged inside the air pipe, a wattmeter measuring the power absorbed by the auxiliary blower (and which decreases when the air heats up), a pressure gauge sensitive to the pressures difference between a lower point and an upper point of the air suction pipe etc.....

The invention also relates to a combustion chamber containing a pipe for drawing off gas, which opens at a slight distance from the gas inlet in the chamber and is substantially coaxial with respect to this inlet. Air is thus preferably admitted all around the drawing off pip and in the opposite direction to the flow of gases.

The accompanying drawing, given as a non-limiting example, will make it easier to understand the addition:

Figure 1:
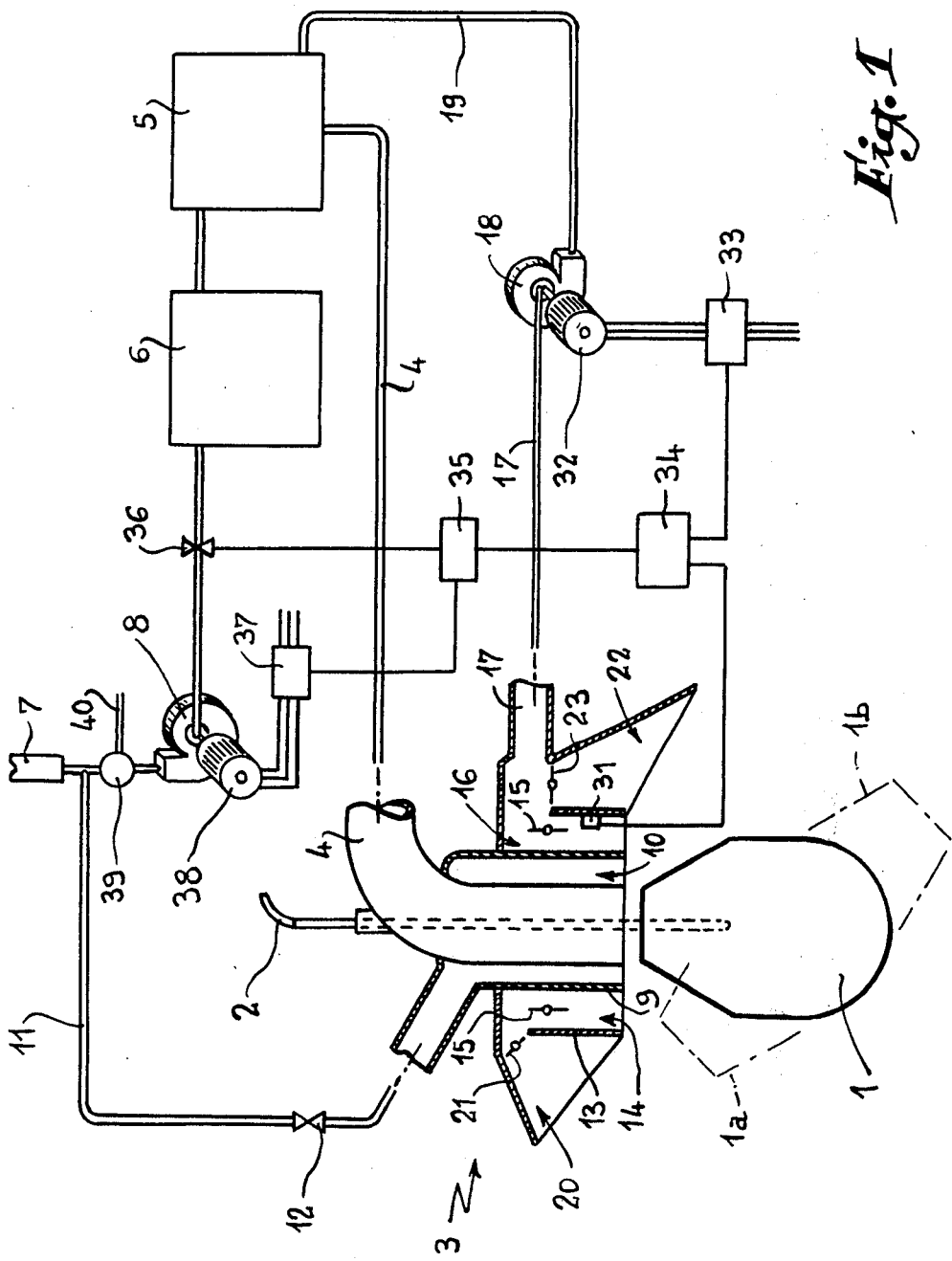
FIG. 1 shows diagrammatically an installation for collecting and recovering the gases leaving a Bessemer converter.

In the diagrammatic illustration of FIG. 1, the reference numeral 1 designates a metallurgical converter of the Bessemer type with the lance 2 for injecting oxygen into the bath of molten metal. The reference numeral 4 designates the gas suction pipe which opens out immediately above the outlet of the converter 1 and terminates at the combustion chamber 5. The gases leaving the latter pass through the dust removing arrangement 6 and are forced into the flue 7 by the main blower 8, which determines the reduced pressure for sucking the gases through the pipe 4. A fraction of the gases delivered by the blower 8 is re-cycled through the pipe 11 and the valve 12 into an annular space 10 surrounding the inlet of the suction pipe 4, with a view of creating in inert cylindrical screen at this point. Provided around the space 10 is another space 14, connected by valves 15 to a pipe 17 for drawing in air leading to an auxiliary blower 18, the delivery pipe 19 of the latter opening into the chamber 5. The reference 3 designates the hood arrangement which surmounts the converter 1. The reference numeral 16 designates the space located above the valves 15 into which the air pipe 17 opens. The references 20 and 22 are auxiliary elemenatary hoods located above the loading and emptying positions of the converter and which are connected to the space 16 by respective valves 21 and 22.

Located in the annular space 14 corresponding to the drawing in of air is a thermometric detector 31, preferably fixed to the outer wall 13 of said space so as not to be influenced by the heating undergone by the inner wall 9 caused by the re-cycled gases. Furthermore, the power absorbed by the motor 32 for driving the auxiliary blower 18 is meausred by a wattmeter 33 and analog signals coming from 31 and 33 are combined in an adding circuit 34 which acts on a control apparatus 35. The latter in turn actuates a valve 36 interposed in the path of gases between the device 6 for removing dust and the main blower 8, as well as on a speed regulator 37 inserted in the input of the motor 38 associated with this blower. Furthermore, located between the outlet of the main blower 8 and the flue 7 is a switching valve 39 which makes it possible to send the gases delivered by 8 either into the aforesaid chamber, or towards a utilisation point which is not shown.

The operation is as follows:

When the converter emits combustible gas in sufficient quantities and it is desired to burn this gas in the combustion chamber 5, the thermometric detector 31 and wattmeter 33 are put out of action. The valve 12 is regulated in order to ensure the formation of the annular screen of inert gas from the space 10 and the switching valve 39 is actuated to connect the outlet of the blower main 8 to the flue 7. Under these conditions, it is possible to actuate the two blowers 18 and 8 so that all the gases leaving the converter are burnt in the chamber 5.

On the contrary, when it is desired to recover these gases without burning them substantially in the combustion chamber 5, the switching valve is actuated such that the outlet of the main blower 8 is no longer connected to the flue 7, but is exclusively connected to a pipe 40 which leads to the utilisation point of these gases. The valves 15 admitting air to the pipe 17 are partially closed so as to reduce by approximately 80% the output volume of the auxiliary blower 18. The detector 31 and wattmeter 33 are once more set in action. Under these conditions, the output of the main blower 8 becomes dependent on the temperature of the air still drawn in by the auxiliary blower 18 as well as on the electrical power absorbed by the latter. Owing to the very high reduction in the volume of air forced into the combustion chamber 5, combustion in the latter is extremely reduced and consequently the combustible gases coming from the converter are virtually all sent to the desired utilisation point after the dust has been removed therefrom and they have been cooled, which utilisation point may be a gasometer, a distribution system, the fire box of a boiler, or even an excess gas burner when the thermal value of these gases is too low. It will be noted that the re-cycling pipe 11 is thus isolated. An inert screen is no longer formed from the space 10 and any overflow of gases leaving the converter passes into the air pipe 17 in which it burns, thus raising the temperature, which due to the detector 31, the adding circuit 34 and the control apparatus 35, increases the speed of the main blower 8 by opening the valve 36 at the same time. The suction effect thus increases, which tends to stop the aforesaid overflow. Furthermore, when the air in the pipe 17 is heated, the power absorbed by the auxiliary blower 18 decreases and the corresponding signal sent by the wattmeter 33 intervenes in the same way as that of the detector 31.

Naturally, it would be possible to use solely either the thermometric detector 31, or the wattmeter 33, but the provision of both apparatus guarantees better regulating reliability in the face of unexpected parasite phenomena (for example an accidental flame which may lick the detector 31).

When the output of gas from the converter decreases, regulation takes place in the opposite direction: the temperature of the detector 31 decreases and the power used by the auxiliary blower 18 increases, which has the effect of slowing down the main blower 8 and closing the valve 36 somewhat.

It should be noted that it is possible to indirectly detect changes in the temperature of the air in the pipe 17 by providing the latter such that its outlet at the blower 18 is located at a higher elevational level than that of its inlet (upwardly inclined pipe). A slight pressure difference thus appears between the inlet and outlet of this pipe, this pressure difference being measurable and varying in a linear manner with the temperature. The thermometric detector 31 may thus be replaced by a sensitive pressure gauge.

Another means able to take the place of the detector 31 and/or wattmeter 33 during the blast stage, consists of measuring the supply of oxygen as a basis for estimating the oxidation rate in the converter; the temperature of the gases then being assumed to be approximately dependent on this supply throughout the aforesaid stage.

The result of the analysis of the gases sampled may also be used as a regulating parameter.

The installation of FIG. 1 also makes it possible to recover non-combustible gases (such as $CO_2$) which the converter emits at certain stages of its operation.

Figure 2:
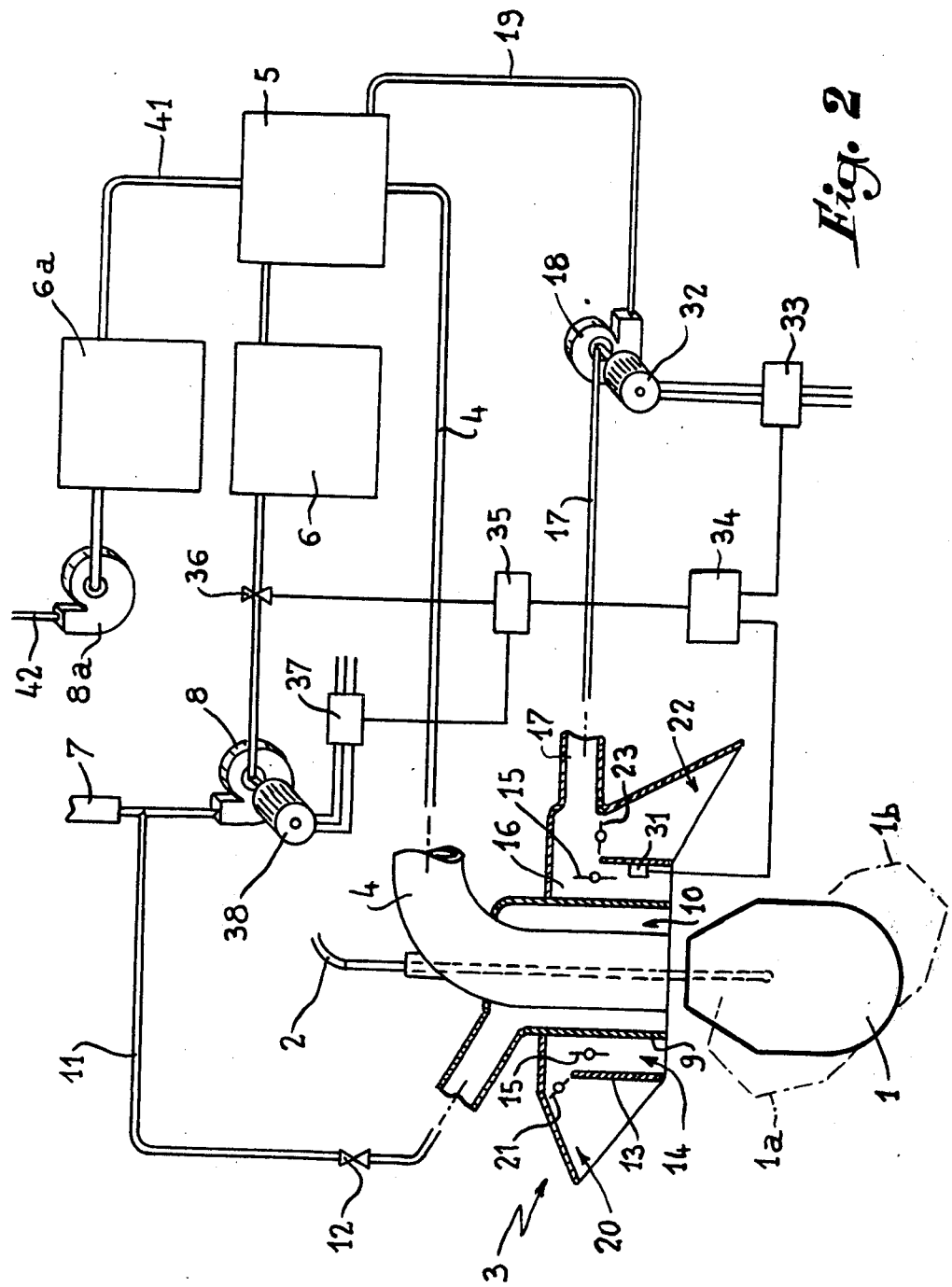
FIG. 2 shows a variation.

As shown in FIG. 2, sampling of the gases recovered may also take place from the chamber 5 itself by an appropriate pipe such as 41. Nevertheless, it is appropriate to note that the main blower no longer intervenes and it is therefore necessary to provide a third blower 8a in the pipe 41. Furthermore, dust is not removed from the gases withdrawn in this way, such that if their dust content constitutes a hindrance, it is necessary to provide an additional dust removing device 6a. The pipe leading to the utilisation point is once more closed at 42. The third blower 8a and the pipe 41 may comprise the same control members as the auxiliary blower 8 and the suction pipe, these members also being controlled by the wattmeter 33 and thermometric detector 31.

Figure 3:
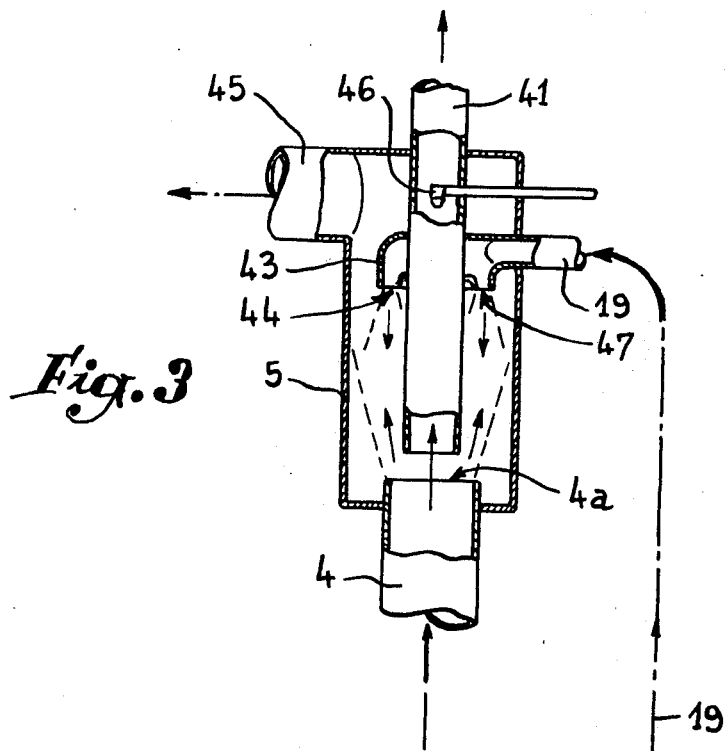
FIG. 3 is a diagrammatic section of one embodiment of the combustion chamber of the variation of FIG. 2.

FIG. 3 shows in diagrammatic section, a preferred embodiment of the combustion chamber 5 in an installation in which it is desired to remove gas substantially without burning it. This chamber is of vertically elongated shape and the gas supply pipe 4 opens into the latter at the bottom at 4a, being directed upwards. The withdrawal pipe 41 opens slightly above this outlet and it is arranged coaxially with respect to the former. As regards the air supply pipe 19, it is connected to an annular head 43 which surrounds the withdrawal pipe inside the chamber 5 in the upper half of the latter, this head comprising nozzles 44 directed downwards towards the outlet of the pipe 4. The outlet 45 for burnt gases opens towards the upper end of the chamber 5. The reference numeral 46 designates a nozzle making it possible to inject an appropriate agent into the pipe 41. This agent may be constituted by water in the form of a liquid or steam. At the high temperature of the gases, this water causes the following reactions:

with the particles of carbon possibly present in the gases, for example due to the dissociation of $CO_2$ to form CO and C at very high temperatures:
$$C + H_2O \longrightarrow CO + H_2 \quad - 31 \text{ KCal.}$$
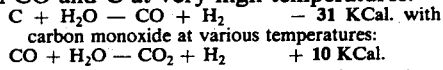
$$CO + H_2O \longrightarrow CO_2 + H_2 \quad + 10 \text{ KCal.}$$

The injection of water or any other substance may take place in the desired manner, either on the inner wall of the withdrawal pipe, or in the gaseous current itself. The injection peferably takes place in the opposite direction to the flow of gas.

As regards the temperature of the gases into which the water is injected, it will be noted that it is easy to keep the latter high firstly by placing the combustion chamber near the converter or converters in order to limit the cooling in the collecting pipe, secondly by arranging to burn in this chamber quite a high proportion of the gases collected in order to obtain a sufficient liberation of heat.

Under the effect of the third blower 8a of FIG. 2, appropriately regulated with respect to the main blower 8, the central part of the column of gas which leaves the pipe 4 is sucked into and flows through the pipe 41 without spreading into the chamber 5. It should be noted that this central part contains only a very low percentage of inert gases coming from the screen produced from the annular space 10, these inert gases having a tendency to constitute a sort of hollow sheath which flows in contact with the wall of the pipe 4. On the other hand, the air which leaves the nozzles 44 is blown downwards in the opposite direction to the peripheral fraction of gases leaving the pipe 4 and which has escaped the suction effect of the pipe 41. There is thus intimate mixing and perfect combustion of the aforesaid fraction, the percentage of unburnt substances becoming negligible. Naturally, the chamber 5 contains means for absorbing heat, such as nests of tubes for the production of hot water or steam for example.

Figure 4:
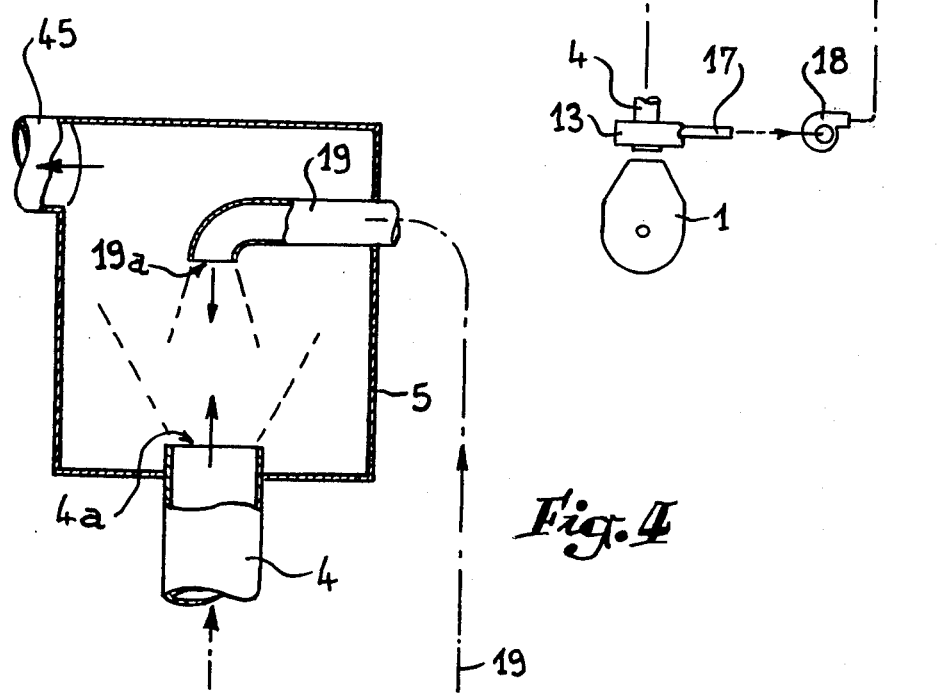
FIG. 4 shows another form of chamber applicable to the case of FIG. 1.

When it is not envisaged to recover gases in the combustion chamber, it is nevertheless advantageous to retain the countercurrent air supply with respect to the inlet of gases into the chamber. This is the arrangement illustrated in FIG. 4. This figure again shows the pipe 19 comprising a single outlet 19a directed vertically opposite the mouth of the gas supply pipe 4.

It should be understood that the preceding description has been given solely as an example and that it in no way limits the scope of the addition, from which one would not diverge if the details described were replaced by other equivalent means.

I claim:

1. In a method for the recovery of gases issuing from a metallurgical refining furnace or converter, in which said gases are drawn off through a hood disposed above the outlet of the furnace and are entered as a gas column into a combustion chamber from which the burnt gases are drawn off by a main blower while air is simultaneously drawn from a space around the furance adjacent to the inlet of said hood by means of an auxiliary blower and is forced into said combustion chamber to burn combustible components of said gases therewithin, the method including the steps of withdrawing a fraction of said combustible gases by sucking them from said gas column substantially before they are mixed with burnt combustion products generated within said combustion chamber to send said withdrawn fraction to utilization means which are external to said combustion chamber.

2. In a method as claimed in claim 1, the step of reducing the output of said main blower and of said auxiliary blower in proportion to the rate of said withdrawal of combustible gases by suction.

3. In a method as claimed in claim 1, wherein a fraction of the burnt gases drawn off from the combustion chamber is introduced by said auxiliary blower annularly around the inlet of said hood to provide an intermediate inert gas screen between said hood inlet and the space from which air is drawn around said inlet, the further step comprising stopping said introduction of burnt gases during said withdrawal of combustible gases by suction.

4. In a method as claimed in claim 1, withdrawing said fraction of combustible gases from within said combustion chamber at a distance from the inlet of said combustible gases into said chamber which is less than the distance from the inlet at which said air is forced into the chamber, whereby said combustible gases have not yet burnt as a result of mixture with the air.

5. In a method as claimed in claim 4, withdrawing said fraction of combustible gases from within said combustion chamber by suction applied coaxially within the entering column of combustible gases and at a point in front of the inlet of said combustible gases into said chamber.

6. In a method as claimed in claim 1, the step of proportioning the output of said main blower in response to the temperature of the air drawn by said auxiliary blower in such manner that said drawn air always contains a small proportion of gases resulting from a slight outward flow of combustible gases from the space between the furnace and said hood.

7. In a method as claimed in claim 6, detecting indirectly an indication of the temperature of the air drawn by said auxiliary blower by measuring the power used by said auxiliary blower, said power decreasing as the temperature of said air increases.

8. In a method as claimed in claim 6, detecting indirectly an indication of the temperature of the air drawn by said auxiliary blower by measuring the pressure differential between a lower elevation point and an upper elevation point spaced therefrom along the direction of flow in the conduit through which said air flows, said pressure differential increasing as the temperature of said air rises.

9. In a method as claimed in claim 1, analyzing the fraction of combustible gases withdrawn by said third blower and controlling the output rate of burnt gas from said main blower in accordance with the result of said analysis.

10. Apparatus for the recovery of gases issuing from a metallurgical refining furnace or converter, of the type having a main hood disposed above the outlet of the furnace, and having a combustion chamber connected with the hood, and having a main blower connected to draw combustible gases through the hood and chamber, and the apparatus having an auxiliary blower connected to draw air from an auxiliary hood located in a space around the main hood and force it into said combustion chamber to burn said gases therein, the improvement comprising:

a first end wall and a second end wall mutually spaced from each other and closing said combustion chamber;

a gas inlet adjacent to said first end wall and extending into said chamber, said gas inlet being connected with said main hood;

a gas outlet from said chamber adjacent to said second end wall, said gas outlet being connected with said main blower;

an air inlet extending into the chamber and connected to receive air drawn by said auxiliary blower;

a withdrawal pipe in the chamber opposed to said gas inlet and opening directly in front of and substantially coaxially with said inlet;

and a third blower connected with said withdrawal pipe and operative to suck combustible gases from said combustion chamber substantially before they have mixed with combustion products generated within said chamber.

11. In an apparatus as claimed in claim 10, said air inlet in the chamber comprising a head surrounding said withdrawal pipe and having air discharge nozzles faced to discharge air toward said gas inlet.

12. In apparatus as claimed in claim 10, means to inject into said pipe a substance such as water or steam to react with the withdrawn combustible gases to increase their content of combustible components.

* * * * *